Patented Aug. 2, 1927.

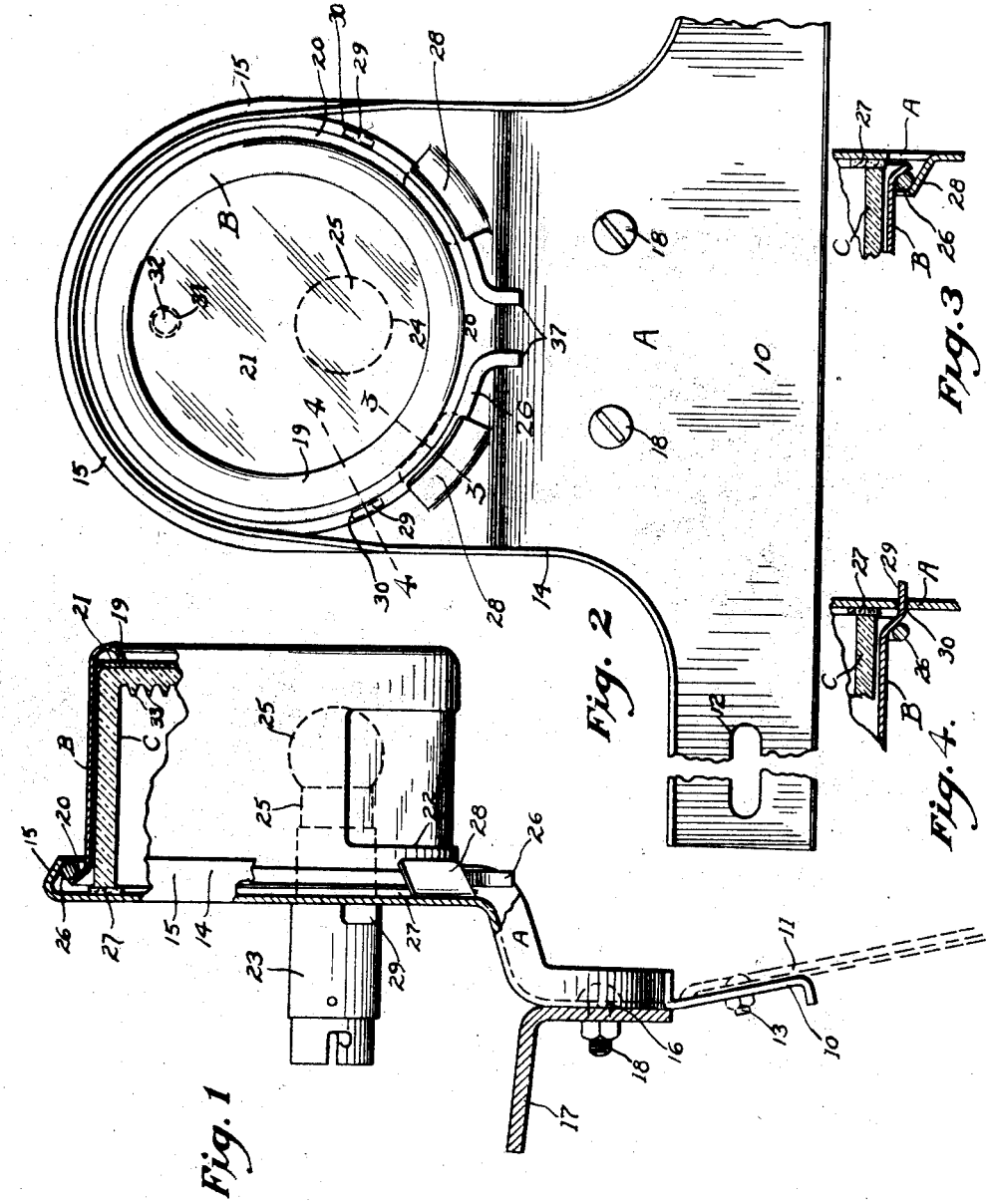
Aug. 2, 1927.  J. GALAMB  1,637,375
LAMP AND BRACKET THEREFOR
Filed Oct. 10, 1923
INVENTOR.
Joseph Galamb.
BY
ATTORNEY.

1,637,375

UNITED STATES PATENT OFFICE.

JOSEPH GALAMB, OF DETROIT, MICHIGAN, ASSIGNOR TO FORD MOTOR COMPANY, OF DETROIT, MICHIGAN, A CORPORATION OF DELAWARE.

LAMP AND BRACKET THEREFOR.

Application filed October 10, 1923. Serial No. 667,596.

The object of my invention is to provide a new and useful device of the class described, of simple, durable and inexpensive construction.

A further object of my invention is to provide a lamp for the rear of a motor vehicle such as is usually termed a tail lamp.

A further object of my invention is to provide such a lamp with improved means for assembling and disassembling so that the lamp may be taken apart for cleaning or replacing the parts without the use of tools.

A further object of my invention is to provide a lamp which may be assembled and disassembled without the use of tools and which is so arranged that the parts which must be removed for replacing the bulb form an assembly which is readily held in the hand during removal and replacement so that it is convenient to change the bulb and the danger of accidental breaking of the parts is largely eliminated.

A further object of my invention is to provide a lamp which is especially adapted for use in connection with a vehicle in that it is substantially impossible to so assemble the parts that they are loose enough to vibrate when the vehicle is moving, thereby eliminating unnecessary wear on the parts and unpleasant rattle.

A further object of my invention is to provide a lamp which will provide a substantially dust tight chamber within which the bulb or other source of light is mounted and which at the same time may be readily assembled and disassembled.

A further object of my invention is to provide a tail lamp which will emit a colored beam of light for warning those back of the vehicle that the vehicle is there and which will also provide a clear or white light for illuminating license and other tags, and to provide in connection with such a light a structure which may be readily cleaned both in regard to the body and light emitting portions.

Still a further object of my invention is to provide a tail light which will combine in a unitary structure a license holding bracket, means for securing the lamp and license holding bracket to a suitable portion of a vehicle and a lamp designed to furnish both a red warning signal and to illuminate the license plate.

Still a further object of my invention is to provide a lamp for a license plate bracket associated therewith which is so constructed that the lamp cannot be assembled in a way that the beam of white light will not shine on the license plate associated therewith.

Still a further object of my invention is to provide a unitary member which shall form a license plate bracket, means for supporting the lamp assembly and the back of a lamp body so that as this unitary structure is part of the lamp itself, then the beam of light from the lamp for illuminating the license plate will always shine in the proper direction.

A further object of my invention is to provide in combination with the unitary structure heretofore mentioned a tubular lamp body having means associated therewith for receiving a colored lens and a clear lens for causing the lamp to give the types of light required for a vehicle tail lamp and to combine with this structure quick detachable means for securing the cylindrical lamp body to the unitary bracket and a lamp back structure.

With these and other objects in view, my invention consists in the arrangement, combination and construction of the various parts of my improved device, as described in the specification, claimed in my claims, and shown in the accompanying drawings, in which:

Figure 1 shows my improved lamp in side elevation, parts being broken away to better illustrate the construction.

Figure 2 shows the lamp from a rear elevation.

Figure 3 shows an enlarged sectional view taken on the line 3—3 of Figure 2.

Figure 4 shows an enlarged sectional view taken on the line 4—4 of Figure 2.

Referring to the accompanying drawings, I have used the reference letter "A" to indicate generally a unitary structure which may be formed from sheet metal in a punch press to form the unitary lamp back and bracket structure which has heretofore been mentioned. This member has a central portion which is generally of semi-circular shape and below this is an elongated and transverse member or portion 10 which is designed to receive a license plate 11. Slots 12 at both ends of the portion 10 receive bolts 13 by which a plate 11 may be secured to the bracket structure.

The semi-circular portion of this bracket structure is surrounded by a flange 14 which is formed integral therewith. This flange has the ordinary purpose of a flange at the edge of a sheet metal member; i. e., to reinforce the sheet metal and strengthen it, and in addition thereto the upper or central portion of this flange 14 has at 15 a further function which will hereinafter be described.

This central or main portion of the bracket member has in the form here shown a pair of openings 16 which are spaced from each other and disposed above the portion 10 of the bracket so that the intermediate or central portion of the bracket may be used by passing bolts 18 or other securing means through the openings 16 to secure the bracket to a motor or other vehicle. For instance, in Figure 1, I have shown an angle iron 17 which may be suitably supported in any manner on a vehicle and preferably forms the cross bar for supporting the tail light and license plate on the tire carrier of an automobile which has the bracket "A" secured thereto by bolts 18 which are passed through the openings 16.

The body portion of the lamp proper consists of a tubular sheet metal structure to which I have given the general reference character "B" which has at its outer or rear end an inturned rounded flange 19 and at its inner or forward end an outwardly turned inclined flange 20.

Received within the tubular shell "B" is a cup-shaped glass or other transparent device to which I have given the indicating character "C".

The inturned flange 19 engages the outer end which is also the closed end of this cup "C" so that this cup may slide into and out of the shell "B" but will be retained from movement out of the shell "B" in one direction by the flange 19. Disposed between this flange 19 and the bottom of this cup "C" is a disc 21 of colored translucent material designed to give a color such as red to the beam of light which passes out of the bottom of the cup "C". In the form here shown this disc 21 of colored translucent material is made from red celluloid.

The lower third of the shell "B" has a rectangular window 22 so that white light may shine from the lamp through this window 22 down on the license plate 11. The dimensions of this opening 22 should be course, and is in the illustration here given, be made such as to properly illuminate the plate used on this bracket.

A socket 23 of usual construction in connection with such lamps is extended through an opening 24 in the bracket member "A" and a bulb or other source of illumination 25 is mounted in the inner end of the socket 23.

The bulb and socket here mentioned are of ordinary construction and will not be further described as they form no part of my invention except in so far as they serve to illuminate the lamp.

The shell "B", the cup "C" and the celluloid 21 are all secured to the lamp back "A" without the use of tools and by a single operation in the following manner: The flange 14 is turned in as has been heretofore described at 15 to form an acute angle with the main or body portion of the member "A". The inclined flange 20 at the inner edge of the shell "B" is also formed to make an acute angle with the body of the member "A" but the angle of the flange 20 is more acute than the angle of the flange 15 so that a groove or channel is formed between these flanges which is tapered to narrow at the bottom of the channel. It will, therefore, be seen that if a resilient wire band 26 is sprung into the channel formed between the flanges 20 and 15 its expansion tends to draw the shell "B" toward the body of the member "A".

A slightly compressible washer or gasket 27, which in the form here shown is made of cardboard, is laid on the body of the member "A" within the lines of the flange 15 so that this drawing motion of the wire 26 will draw the shell "B" toward the member "A", thereby in turn causing the edge of the cup "C" to be forced against the gasket 27 and the celluloid disc 21 to be compressed between the flange 19 and the bottom of the cup "C".

It will be noted that the flange 15 is only substantially half of a circle, and that its coaction with the wire 26 may be still further enhanced by pressing up the tongues 28 near the bottom of the shell "B" and that the portion of the ring 26 adjacent to its ends may coact with the flange 20 and the tongues 28 in the same manner as the flange 15 coacts with the wire 26 and flange 20. The ends of the wire 26 are herein shown turned out at 37 to form handles which may be grasped between the fingers of the operator to compress the ring 26 so that it may be sprung from between the flange 20 and the flange 15 and tongues 28 to permit ready removal of the cup C, shell "B", celluloid 21 or the bulb 25. Where the shell "B" with its coacting parts is simply placed within the confines of the tongues 28 and the flange 15, I have found that it is difficult to center the shell with the flange and tongues when the ring 26 is sprung into place and of course it is also difficult to be sure that the shell "B" is properly placed so that the light emanating from the opening 22 will be properly directed on to the license plate 11.

I have solved the problem of readily placing and removing the ring and at the same time properly positioning the shell "B" to illuminate the license plate by the use of the tongues 29 which extend from the edge of the flange 20 of the shell "B" through corresponding slots or openings 30 in the body of the member "A" adjacent to the tongues 28.

I have found that by using these two tongues with the elongated slots which are set at an angle to each other that the body or shell "B" will be so accurately placed on the member "A" that little or no difficulty is experienced in either placing or displacing the ring 26 when desired.

The gasket 27 has an opening corresponding to the opening 24 in the member A which closely fits the outside of the socket 23 and it also has a second opening spaced therefrom and of similar diameter at 31. The member "A" is pressed out to form a button 32 adapted to enter the opening 31 in the gasket 27 so that the gasket 27 is centered by this button 32 and socket 23 so that its edges will properly coincide with the edges of the cup "C." The surface of the bottom of the cup "C" which is toward the inside of the light and opposite the celluloid 21 may be corrugated and in the form here shown has corrugations or circular ridges 33. These circular rings or ridges on the inside of the glass largely multiply the efficiency of the beam of red light coming out of the celluloid 21 and materially improve the appearance of the light emanating from the lamp.

Among the many advantages resulting from the use of my improved lamp it may be specifically pointed out that I have made a combined lamp and license plate bracket assembled in such a way that the light from the tail lamp must properly shine on the license plate. Further I have succeeded in devising a lamp which combines the bracket member for supporting both the lamp and license plate with the back of the lamp body, thereby eliminating the cost of a separate lamp back and at the same time simplifying both the assembly and the manufacture of the lamp and bracket. A further advantage resulting from the use of my improved lamp is that a glass body or lens is used for a clear light which shines on the license plate, this glass body being part of a dust proof enclosure which prevents the inside of the glass from becoming clouded with ordinary use. The outside of both the clear glass portion of this lamp and of the colored translucent portion are plain surfaces so that they are very readily cleaned and in fact the entire body of the lamp is of such simple design that it may be easily cleaned. Moreover, it will be noted that the flange 15 forms a cowl over the means for assembling the lamp body so that these are largely protected against ordinary rust producing agencies. Moreover, it will be noted that it is impossible to put the parts of this lamp together in so far as I have been able to discover in more than one way; that is, the lamp must be properly assembled if it is assembled at all. The entire lamp is very cheaply and easily manufactured as will be noted especially from the unitary construction forming a combined lamp back, license plate holder, and lamp bracket which may all be struck out on a punch press from ordinary sheet metal with but a few operations.

Some changes may be made in the arrangement and construction of the various parts of my improved device without departing from the spirit of the invention therein, and it is my intention to cover by my claims such changes as may be reasonably included within the scope thereof.

I claim as my invention:

1. In a lamp, a substantially flat back member forming a combined license plate holder bracket and lamp back, a tubular body member having retaining means at its outer end, a cup shaped lens member of transparent material within said body, a translucent colored lens member, disposed against the bottom of the cup lens and means for securing said body member to the back member, adapted to press the translucent member against the cup lens and the cup lens against the back member by the engagement of the retaining means with the translucent member.

2. In a lamp, a substantially flat back member having a license plate holding extension, a tubular body member having a retaining flange at its outer end and a light emitting opening in one side thereof, a cup shaped lens mounted within said body, and means for securing the body to the back adapted to press the cup shaped member between the flange and the back, said means including devices for insuring that the body member will always assume a predetermined position relative to the back member when assembled thereto whereby said light emitting opening will be in position towards the license plate holding extension of the back member.

3. In a lamp, a member formed from sheet metal having a transverse elongated portion adapted to support a license plate, an intermediate portion adapted to be secured to a vehicle and a semi-circular portion adapted to form a back for a lamp, said semi-circular portion having an inturned flange formed at its edges, a tubular body member having an inturned flange at its outer end and an outwardly extending flange at its inner end, a cup shaped lens member disposed within said tubular body, said tubular body having an opening in the side thereof adapted to permit a beam of light to shine therethrough, means associated with the first described member and the body member for causing the opening in the latter to assume a predetermined position when the body member is assembled to the first described member, and a resilient ring adapted to be received between the flange on the first described member and the flange at the inner end of the body member to thereby press the body member toward the first described member and to press the cup shaped member between the flange at the outer end of the body and the first described member.

Dated Sept. 20th, 1923.

JOSEPH GALAMB.